United States Patent [19]

Werner

[11] 4,346,832
[45] Aug. 31, 1982

[54] SNAP-LOCK CONTAINER

[76] Inventor: Jack R. Werner, 6500 Farralone, Canoga Park, Calif. 91304

[21] Appl. No.: 809,617

[22] Filed: Jun. 24, 1977

[51] Int. Cl.³ .............................................. B65D 3/00
[52] U.S. Cl. ..................................... 229/4.5; 229/5.5; 229/48 T; 220/74; 220/69
[58] Field of Search ....................... 220/73, 74, 68, 69, 220/306; 229/4.5, 48 T, 48 SA, 5.5, 48 SC

[56] References Cited

U.S. PATENT DOCUMENTS

| | | | |
|---|---|---|---|
| 2,356,401 | 8/1944 | Hatch | 229/4.5 |
| 3,111,240 | 11/1963 | Whitton, Jr. | 220/306 |
| 3,182,882 | 5/1965 | Allen, Jr. et al. | 229/48 SC |
| 3,734,393 | 5/1973 | Stump | 229/5.5 |
| 3,739,976 | 6/1973 | MacDaniel | 220/306 |
| 3,899,117 | 8/1975 | Peyser et al. | 229/5.5 |
| 3,912,154 | 10/1975 | Godar | 229/5.5 |
| 3,967,731 | 7/1976 | Boduch | 220/306 |

FOREIGN PATENT DOCUMENTS 1904953  2/1969  Fed. Rep. of Germany ....... 229/5.5
549368   3/1956  Italy ....................................... 220/69

Primary Examiner—Joseph Man-Fu Moy
Attorney, Agent, or Firm—Marvin E. Jacobs

[57] ABSTRACT

A container for holding material such as ice-cream, which can be readily fabricated at a local container-filling plant, out of rolls of stock material and other easily stored and transported components. The container includes a sheet of kraft paper with thermoplastic coatings and a pair of U-shaped edgings extending along opposite sides, the sheet formed in the shape of a cylinder and having ends which are overlapped and heat welded together. A bottom cover includes a U-shaped periphery that extends around the lower edging, and which has a pointed inwardly-directed boss that securely engages a corresponding bead on the edging, the engagement being tightened when the container is filled with material that deflects the bottom cover downwardly. The top cover includes a beaded rim extending around the cylinder in a close fit therewith, and which can slide up to accommodate expansion of ice cream which expands as it freezes.

15 Claims, 3 Drawing Figures

SNAP-LOCK CONTAINER

BACKGROUND OF THE INVENTION

This invention relates to containers and to a process for constructing a container.

Ice cream intended to be sold in specialized ice cream parlors, are typically packaged in cylindrical three gallon containers formed of wax-coated kraft paper with metal bands that hold covers to the ends of the container. The cylindrical containers are folded flat for shipment to a local filling factory, where the containers are opened and filled with ice cream. It has been found that the kraft paper cardboard can develop leaks, and that the steel banding can break, crack, or split to leave sharp edges that are dangerous to clerks scooping out ice cream. Vacuum formed plastic drums could be utilized, except that they utilize considerable amounts of plastic which results in their being relatively expensive, they cannot be easily and rapidly formed at a local filling plant, and even where they are made to be stackable, there is considerable air space which makes transport and storage expensive. A container formed largely of cardboard, which could be constructed at low cost and of compactly storable components in local plants, would be of considerable value to the packaging industry.

SUMMARY OF THE INVENTION

In accordance with one embodiment of the present invention, a container and method for manufacturing it are provided which enables low cost container fabrication and which provides a container that reliably holds goods. The container can include a cylindrical portion formed of a sheet of material with edge strips, the sheet is formed to a cylindrical shape and with its ends fused together. The edge strips form beads at the bottom and encircles the bottom edge and which has an inwardly angled bead that easily slips over the bottom bead and then securely holds thereto, the holding being enhanced when the container is filled so that considerable weight rests on and bends the bottom cover. The top cover includes a bead lying below the bead on the cylinder to hold to the cylinder even when an ice cream product in the cylinder freezes and therefore expands.

The container can be fabricated by utilizing a rolled web of low cost material such as a kraft wood fiber material having thin coatings of thermoplastic material thereon to form most of the cylinder. As the web is pulled from the roll, U-shaped edge extrusions are pressed against the opposite sides of the web and then fused thereto. The web with edging thereon is cut and rolled onto a cylindrical mandrel with the ends of the cut sheet overlapping, and the overlapped portion is then fused to form a cylinder. Preformed bottom and top covers may then be applied.

The novel features of the invention are set forth with particularity in the appended claims. The invention will best be understood from the following description when read in conjunction with the accompanying drawings.

BRIEF DESCRIPTION OF THE DRAWINGS

FIG. 4 is a side elevation view of a stack of containers of the type shown in FIG. 2.

DESCRIPTION OF THE PREFERRED EMBODIMENTS

Figure 2:
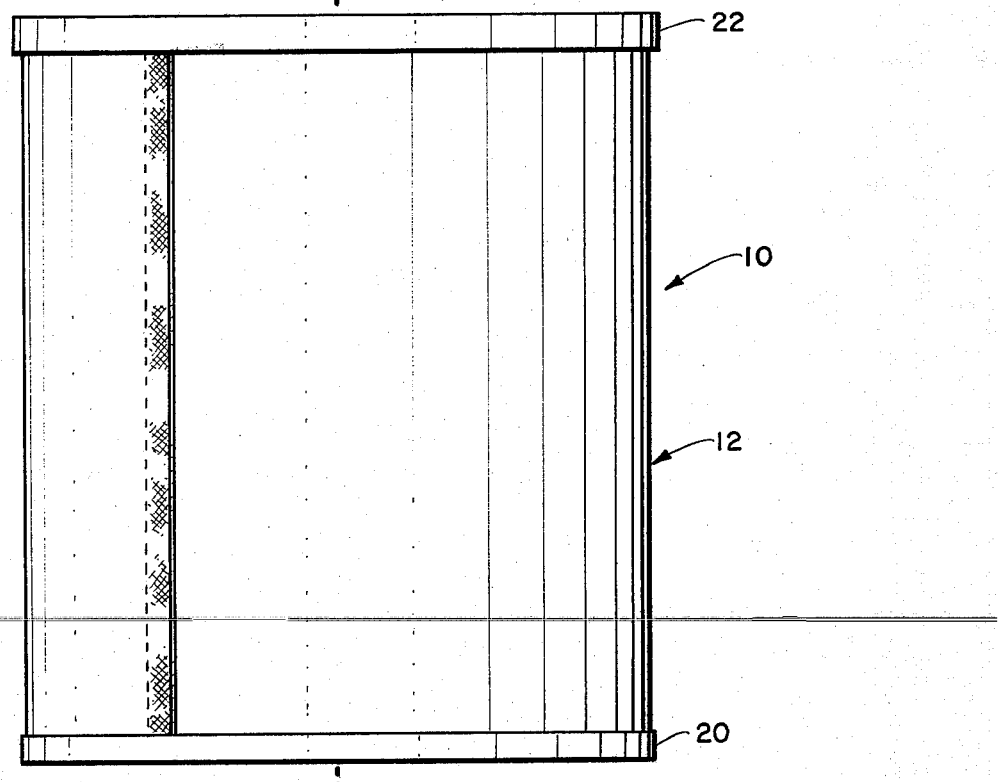
FIG. 2 is a side elevation view of a container constructed by the process of FIG. 1.
Figure 3:
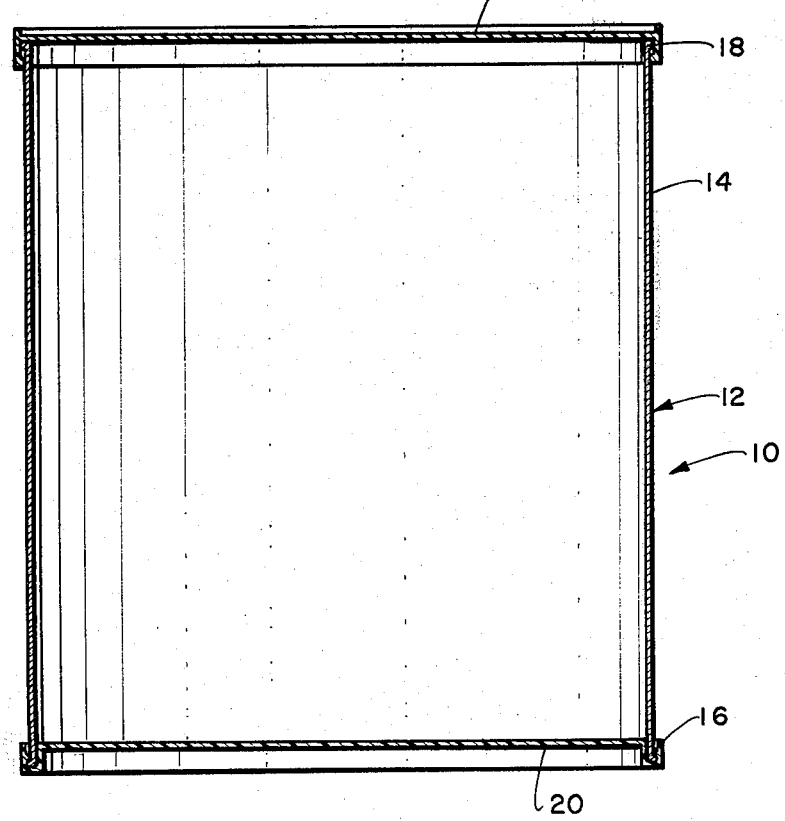
FIG. 3 is a view taken on the line 3—3 of FIG. 2.

FIGS. 2 and 3 illustrate a container 10 designed to hold a quantity such as three gallons of ice cream or the like. The container includes a cylinder 12 that comprises a sheet 14 wrapped into a cylindrical form, and bottom and top edge members 16, 18 disposed at the bottom and top edges of the cylindrical sheet. The ends of the cylinder 12 are covered by bottom and top covers 20, 22. The top cover 22 is formed with a flange 24 designed to receive the bottom cover 20 of another container, to permit several sealed containers to be stably stacked on one another, in the manner shown in FIG. 4.

Figure 5:
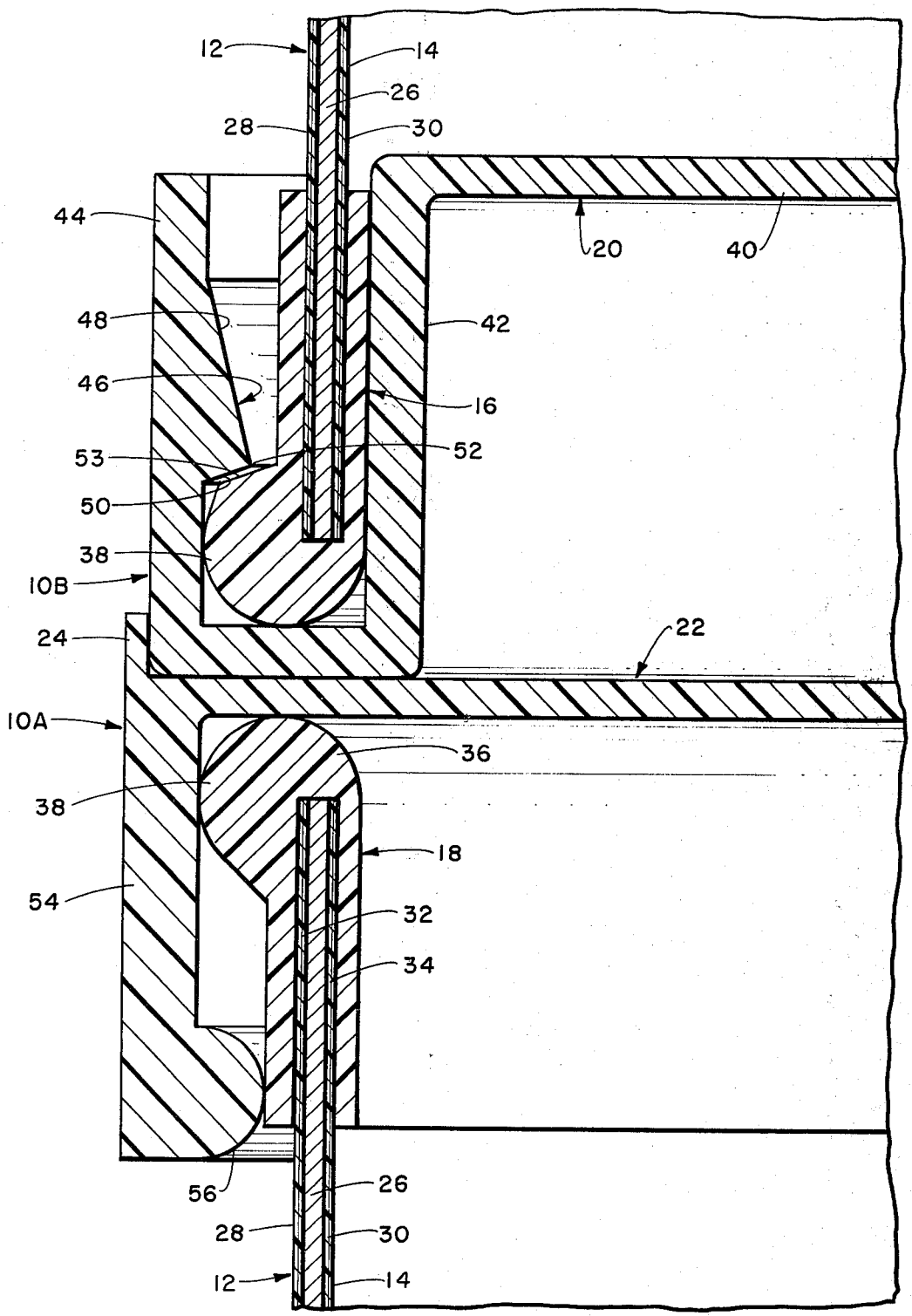
FIG. 5 is an enlarged view taken on the line 5—5 of FIG. 4.

FIG. 5, which shows portions of two containers 10A and 10B stacked on one another, illustrates details of the container construction. Each sheet 14 which forms a container side wall, includes a sheet or layer 26 of cardboard such as bleached kraft wood fiber of a thickness such as 30 mil (30 thousandths inch) covered with thin layers of plastic 28, 30 such as polyethylene having a thickness of one mil. The edge members such as 18, are an extruded part formed of plastic such as polyethylene. The edge member 18 is of U-shape, with a pair of legs 32, 34 that lie on opposite sides of the sheet 14, and with a base 36 connecting the legs. The base 36 is formed with a bead 38 that extends radially outwardly. The top and bottom edge members 18, 16, may be formed identi- The bottom cover 20 includes a flexible sheet-like portion 40 covering most of the container bottom, and a U-shaped peripheral portion 42 which extends around the lower edge member 16. The outer flange or leg 44 of the peripheral portion includes an inwardly-extending bead or boss 46 with an upper surface 48 extending at a small inclination less than 30° from the vertical, and a lower surface 50 extending at a large inclination of more than 60° from the vertical, and with the two surfaces 48-50 meeting in a relatively small radius or sharp corner 52. The lower surface 50 and corner 52 may bear against an upwardly directed flattened face 53 of the bead 38 and trap the bead 38 on the lower edge member to prevent the removal of the cover after it has been installed. The slightly inclined upper surface 48 enables the outer leg 44 of the cover to easily deflect outwardly as the cover is installed, until the bottom cover has been installed far enough for the corner 52 to deflect over the bead 38 on the lower edge member. Thus, the cover is easily installed, and securely holds to the cylindrical container portion after installation.

After the cover has been installed, the goods, such as three gallons of ice cream weighing about fifteen pounds, may be dispensed into the container. The weight of the goods causes the middle portion of the bottom cover 20 to deflect slightly downwardly. As a result, the peripheral portion 42 of the bottom cover tends to rotate slightly in a clockwise direction as viewed in FIG. 5. This causes the boss 46 to move inwardly to lock the cover even more securely to the cylinder of the container.

The top cover 22 does not have to hold as securely to the container as the bottom cover, and therefore is formed with an axially-extending flange 54 at its periphery, with the flange extending downwardly and having a rounded inwardly projecting bead 56 at the bottom. When the cover 22 is installed, the bead 56 passes across the bead 38 on the upper edge member 18 and then bends inwardly again. The cover tends to remain in a closed condition, against small upward forces, because of the interference of the beads 56, 38, although the cover can be removed when a large upward force is applied to it. The cover flange 54 is made long enough that the bead 56 thereon lies an appreciable distance such as one-quarter inch below the bead 38 on the cylinder. This avoids popping off of the cover when the ice cream in the container expands slightly as it freezes. It can be seen that the upstanding flange portion 24 on the top cover can closely receive the periphery of the bottom cover 20, to permit stable stacking of the containers.

Figure 1:
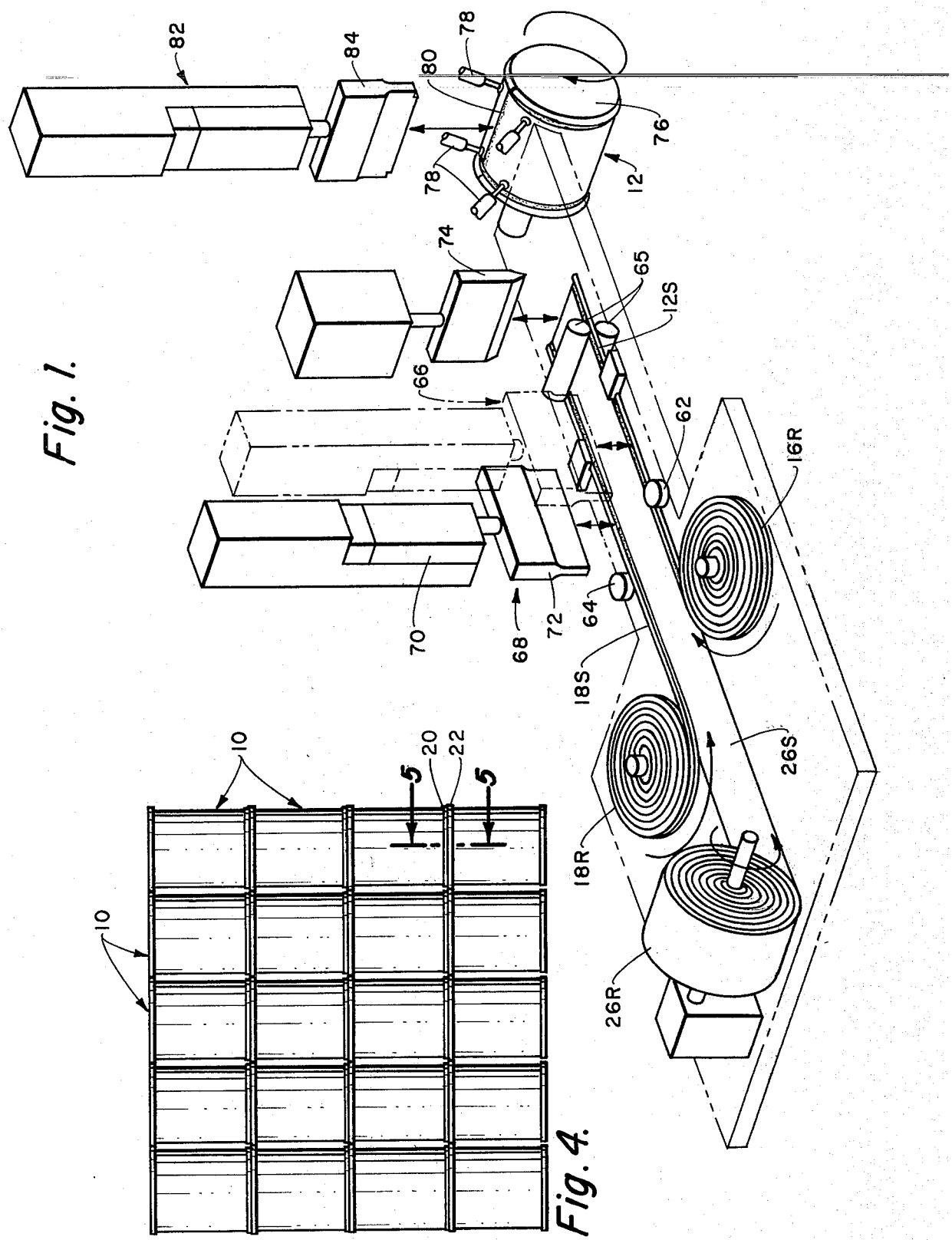
FIG. 1 is a simplified perspective view of equipment utilized in a fabrication process of one embodiment of the invention, to produce a container constructed in accordance with an embodiment of the invention.

As described above, the container basically includes a cylinder with bottom and top edge members thereon, and bottom and top covers for closing the ends of the cylinder. The bottom and top covers can be formed in large quantities by a variety of processes such as vacuum forming of plastic sheets, injection molding of plastic, stamping of metal, or forming of sheets of coated cardboard. The covers can be easily stacked for transport and storage in a relatively compact manner. The cylinder 14 can be formed at a local container-filling plant or elsewhere, by the use of rolls of material, in the manner illustrated in FIG. 1.

The cylinder 14 is formed from a roll 26R of plastic-coated cardboard, such as medium density polyethylene coated, bleached kraft board and from two rolls 16R, 18R of extruded edge member material such as polyethylene. As the strip 26S of structural material is unrolled from the roll 26R, the strip moves along a path extending between the two edge material rolls 16R, 18R. The elongated U-shaped edge member material is simultaneously unrolled, and pressed by a pair of rollers 62, 64 against the edges of the strip, so that the legs of the edge member material lie on opposite faces of the strip. The rollers 62, 64 and pinch rollers 65 that advance the strip 26S are motor driven. A pair of fusing devices 66, 68 are positioned on opposite sides of the path of the strip and edging, to fuse them together. Each fusing device such as 68, includes a plunger 70 having a horn 72 at its lower end and an ultrasonic tranducer (not shown) which transmits sound waves through the horn. To fuse the edge material to the wide structural strip, the movement of the strip and edge material is momentarily stopped and the plunger 70 moves down to press the horn 72 against the edging strip 18S. Ultrasonic vibrations transmitted through horn 72 cause the end of the horn to vibrate against the edging strip 18S to produce frictional heating that fuses the legs of the edging strip 18S to the faces of the structural material strip 26S.

After a sufficient length of fused-together material has passed a cutting blade 74, the blade is pressed against the combined strip 12S to sever a desired length of the strip. This cut strip or sheet is then wound onto a substantially cylindrical mandrel 76 and held thereon by holding devices 78. The length of the cut sheet 12 is just long enough to fit around the circumference of the mandrel 76, with a small amount of overlap at 80. Another fusing device 82 is then utilized, which has a horn 84 that presses against the overlapped region 80 to fuse the sheet into a cylindrical shape. The fused cylinder 12 then can be removed from the mandrel, and a bottom cover can be applied to form a container.

Thus, the invention provides a cylinder assembly which can be manufactured at low cost, and covers therefor which can be easily installed and which reliably hold to the cylinder assembly to provide a strong reliable container. The cylinder assembly can be constructed at low cost by the use of kraft paper coated on both sides with a thin coating of thermoplastic material, to enable low cost fusion to itself as well as to other thermoplastic parts by processes such as ultrasonic welding which produces fused joints. Thermoplastic edgeing of U-shaped cross section, which can be formed at low cost by extrusion, can be attached to opposite edges of a sheet of the coated kraft structural material and fusion joined thereto. The sheet with edging thereon then can be wrapped into a cylindrical shape with the ends overlapped so that the coatings on opposite sides of the sheet lie on one another, and these coatings then can be fused together to form a cylinder. The edging can be formed with beads thereon that facilitate the secure installation of top and bottom covers. A bottom cover, which must hold reliably to the cylinder even when considerable weight lies on the bottom cover, includes a flange at the periphery with an inwardly extending boss or retention bead. This boss has a sharp corner with a lower surface securely engaging the bead on the cylinder to prevent cover removal. Loading of the bottom cover causes inward turning of the flange to even more securely lock it in place. A top cover for the cylinder includes an inwardly extending bead that rides over the top bead on the cylinder to securely remain thereon. For a container designed to hold ice cream, the cover bead is located at the end of a long flange so it normally lies spaced below the top bead on the cylinder, to prevent popping off of the cover when the ice cream expands during freezing. The cylinder portion of the container can be formed out of rolls of material using equipment of only moderate cost, so that the material can be compactly stored and the containers can be manufactured at a local container filling plant. The thermoplastic coating of polyethylene or the like on inexpensive kraft paper, not only permits fusion bonding, but also has an advantage over the typical wax utilized on present containers offering a superior printable surface.

It is to be realized that only preferred embodiments of the invention have been described and that numerous substitutions, modifications and alterations are permissible without departing from the spirit and scope of the invention as defined in the following claims.

What is claimed is:

1. A cylinder assembly with top and bottom ends which can be covered to form a closed container comprising:
    a stiff, resilient, paperboard sheet with top and bottom edges and opposite ends, which includes inner and outer coatings of thermoplastic material;
    at least one edge member disposed at at least one of said edges of said sheet, each edge member having a pair of legs lying against opposite faces of the sheet structure and a base portion connecting the legs, abutting said top or bottom edge and formed with a radially, outwardly extending bead;

said sheet structure being formed into a largely cylindrical shape by wrapping said coated sheet into cylindrical shape with the opposite ends overlapped so that the inner and outer coatings are in contact and said inner and outer coatings being thermally fused together at the overlapped sheet ends; and each of said edge members being formed of thermoplastic material with the legs thereof thermally fused to the inner and outer thermoplastic coatings of said sheet structure.

2. The cylinder assembly described in claim 1 in which the paperboard sheet is many times thicker than the coatings.

3. The cylinder assembly described in claim 3 in which the paper is bleached kraft paper.

4. The cylinder assembly described in claim 3 in which the coatings are formed of a physiologically safe polyolefin.

5. The cylinder assembly described in claim 4 in which the coatings comprise polyethylene.

6. The cylinder assembly described in claim 5 in which the edge members are formed of polyethylene.

7. The cylinder assembly described in claim 1 including:

a bottom cover for covering an end of said cylinder assembly; and wherein a first of said edge members has a radially-outwardly-extending bead;

said cover has a middle portion for supporting the weight of goods and has a U-shaped peripheral portion extending closely about said edge member, said peripheral portion having a boss on the outer leg of the U to pass across the bead on the edge member;

said boss having a radially-inwardly-extending corner portion which abuts said bead when force is applied to said middle portion, whereby to resist cover removal by the weight of goods resting thereon.

8. The cylinder assembly described in claim 7 in which the cover is formed of a resilient synthetic plastic.

9. The cylinder assembly described in claim 8 in which the plastic is polyethylene.

10. The cylinder assembly described in claim 1 wherein:

said bottom edge includes said edge member having a radially-outwardly-extending bead and including:

a bottom cover for covering said end, including a flange portion lying outside said cylindrical member end and having a radially-inwardly-extending bead positioned to pass across the bead on said cylindrical member;

at least one of said beads having a sharp corner engaging the other bead and having a surface facing said bead, said surface extending at an angle of more than 60° to the axis of the cylinder when said cover and member are assembled, whereby to lock the cover in place after installation.

11. The container described in claim 10 wherein:

said at least one bead has a second surface facing away from the other bead, and extending at an angle of less than 30° to the axis of the cylinder when said cover and member are assembled, whereby to facilitate installation of the cover.

12. The container described in claim 10 wherein:

said cylindrical member has a bottom end receiving said cover; and said cover includes a flexible sheet portion extending along most of the cover area, whereby the weight of goods on said cover bends said cover to tilt said flange to more securely lock the cover bead over the cylindrical member bead.

13. The container described in claim 10 wherein:

said cover has a U-shaped peripheral portion which closely fits about said end of said cylinder member, said flange forming the radially outer leg of the U-shaped portion.

14. The cylinder assembly described in claim 1 wherein:

said top edge includes said edge member having a radially-outwardly-extending bead and including;

a top cover having an axially extending flange at the periphery for passing across said cylindrical member, said flange having a radially-inwardly-extending bead near the free end of said flange lying against a portion of the cylindrical member which is below the bead thereon;

said flange being long enough that said bead thereon is spaced below and out of contact with the bead on the cylindrical member when the cover is allowed to moved down freely without restraint by goods in the cylindrical member, whereby to avoid popping off of the cover when the contents of the container expand.

15. The container described in claim 16 including:

a bottom cover for covering the lower end of said cylindrical member, said top cover having an upstanding lip at the periphery that closely receives the bottom cover on another cylindrical member, whereby to enable stacking of containers.

* * * * *